US006422744B1

(12) United States Patent

Galenkamp et al.

(10) Patent No.: US 6,422,744 B1

(45) Date of Patent: *Jul. 23, 2002

(54) METHOD OF TESTING A DISPLAY DEVICE DURING THE MANUFACTURE THEREOF

(75) Inventors: Hans Galenkamp; Bruno W. J. Spolders, both of Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,455

(22) Filed: Oct. 8, 1998

(30) Foreign Application Priority Data

Oct. 8, 1997 (EP) .......................................... 97203125

(51) Int. Cl.[7] ............................................. G01V 25/72

(52) U.S. Cl. ............................... 374/57; 374/5; 374/45

(58) Field of Search ............................... 374/57, 5, 45; 65/116, 104

(56) References Cited

U.S. PATENT DOCUMENTS

| | | | | | |
|---|---|---|---|---|---|
| 3,839,006 | A | * | 10/1974 | Pikor | 65/174 |
| 3,894,858 | A | * | 7/1975 | Rogers | 65/23 |
| 3,970,456 | A | * | 7/1976 | Branton | 96/36.1 |
| 4,519,718 | A | * | 5/1985 | Staffin et al. | 374/45 |
| 4,681,775 | A | * | 7/1987 | Gallaro | 427/64 |
| 4,733,973 | A | * | 3/1988 | Machak et al. | 374/5 |
| 4,793,716 | A | * | 12/1988 | Wei et al. | 374/45 |
| 5,167,451 | A | * | 12/1992 | Muller et al. | 374/57 |
| 5,188,533 | A | * | 2/1993 | Dougherty | 445/8 |
| 5,294,199 | A | * | 3/1994 | Boersen et al. | 374/56 |
| 5,846,110 | A | * | 12/1998 | Kanagu et al. | 445/25 |
| 5,959,399 | A | * | 9/1999 | Arimoto et al. | 313/461 |
| 5,964,630 | A | * | 10/1999 | Slusarczuk et al. | 445/25 |
| 2002/0039870 | A1 | * | 4/2002 | Kaneko et al. | 445/3 |

FOREIGN PATENT DOCUMENTS

| | | | | |
|---|---|---|---|---|
| JP | 0117127 | * | 6/1985 | 374/57 |
| JP | 0096232 | * | 8/1991 | 374/57 |

* cited by examiner

*Primary Examiner*—Diego Gutierrez
*Assistant Examiner*—Gail Verbitsky

(57) ABSTRACT

A method of manufacturing a display device comprising an air-tight envelope and at least a glass part (3) which forms part of said air-tight envelope, is characterized in that the glass part (3) is warmed up, during a first time period, at a first temperature ($T_1$), whereafter the glass part is immersed, during a second time period, in a fluid (32) at a second temperature ($T_2$), said second temperature being lower than the first temperature ($T_2<T_1$). Preferably, $25° \leqq T_1-T_2 \leqq 85°$, and, in particular, $T_1-T_2 \approx 50°$. Preferably, $50°\ C. \leqq T_1 \leqq 100°\ C.$, and, in particular, $T_1 \approx 65°\ C.$ Preferably, the glass part is a display window (3) or a cone portion of a display window, and the fluid is water (32).

8 Claims, 2 Drawing Sheets

METHOD OF TESTING A DISPLAY DEVICE DURING THE MANUFACTURE THEREOF

BACKGROUND OF THE INVENTION

The invention relates to a method of testing a display device comprising an air-tight envelope and at least a glass part which forms part of said air-tight envelope during the manufacture thereof.

Display devices of the type mentioned in the opening paragraph are used, inter alia, in television receivers and computer monitors.

A display device of the type mentioned in the opening paragraph is known. The known display device comprises an air-tight envelope with a display window. In the case of a cathode ray tube (CRT), the envelope also comprises a cone portion and a neck which accommodates an electron gun for generating (one or more) electron beams. These electron beams are focused on a phosphor layer on the inner surface of the display window. In the case of a plasma display panel (PDP), the air-tight envelope comprises a faceplate, which serves as the display window, and a rear plate, said plates being connected to each other by means of connecting parts. A plasma display panel contains an ionizable gas in which a plasma discharge is generated, and electroluminescent or photo-luminescent phosphors being used to produce an image.

The known display device has a number of shortcomings, in particular the occurrence of product failure during the manufacture of the display device, which product failure is caused by fracture as a result of, for example, implosion of the display device during the evacuation of the envelope.

OBJECTS AND SUMMARY OF THE INVENTION

It is an object of the invention to provide a method of selecting the glass parts mentioned in the opening paragraph in an early stage of the manufacturing process of the display device, so that the risk that the above-mentioned problem occurs is reduced.

To achieve this, the method in accordance with the invention is characterized in that the glass part is warmed up at a first temperature during a first time period, whereafter the glass part is immersed in a fluid at a second temperature during a second time period, said second temperature being lower than the first temperature. The fluid may be a gas or, preferably, a liquid.

Since glass is a brittle material, it is sensitive to surface damage and stress-related phenomena. Surface damage is generally difficult to detect by people who are not skilled in the art, and adverse effects of (surface) stresses in glass may not give rise to problems until late in the manufacturing process. In addition, it is not clear how and which surface damage as well as which types of stress in the part contribute substantially to product failure during the further assembly of the air-tight envelope and the display device. Product failure is caused, in particular, by implosion of the envelope of the display device when this is evacuated (for the first time). In said evacuation process the envelope is also brought to a relatively high temperature (300–400° C.). Such implosions are often initiated by said surface damage or too high a surface stress. When the air-tight envelope of the display device is evacuated for the first time, the display device already is in an advanced stage of assembly, so that an implosion during evacuation and warm-up implies a loss of production.

By subjecting the glass part to a thermoshock test in accordance with the invention, any defects, such as surface defects and stresses at the surface and in the interior of the glass part become visible. The method in accordance with the invention enables said surface damage and stresses to be detected at an early stage, so that such parts can be excluded from the further manufacturing process of the display device. If, for example, in the case of a cathode ray tube, a display window is subjected to the method in accordance with the invention, it can be determined, before the display window is provided with a phosphor pattern and a shadow mask, and before the display window is fitted to the cone portion of the envelope of the display device, whether surface damage on or stresses in the display window will lead to product failure at a later stage of the manufacturing process (for example during evacuation of the envelope). A fluid which can particularly suitably be used for immersing the glass part is the liquid medium water.

Factors involved in the initiation of surface damage of and stresses in glass parts of display devices are, in particular, scratches made in the manufacture of the glass parts and during positioning and handling the parts on a conveyor belt. Another important factor, in particular, for display windows of CRTs having a raised edge via which the display window is connected to the cone portion, and which edge is generally provided with connecting points for connecting a selection electrode or shadow mask, is the degree of compressive stress present in the raised edge of the display window. In general, the method in accordance with the invention does not make a distinction between surface damage and (internal) stresses of the glass part. The resistance to quenching generally is a combination of surface roughness and internal stress of the glass part. The term "quenching" of the glass part is to be taken to mean, in this application, a thermal shock caused by suddenly cooling the part ("thermoshock treatment"), for example by immersing in water.

Said thermoshock treatment in accordance with the method of the invention causes cracks to grow at the outside surface of the glass part. These cracks are generally caused by surface damage or they develop in a region where the stress is relatively high. Quenching of the glass part causes the outside surface to be subject to tensile stress, while the material in the interior of the glass part is subject to compressive stress; as a result, cracks do not grow through the glass (i.e. cracks do not propagate in the interior of the glass). This has the advantage that no portions of the part become detached or severed, which would lead to contamination of the set-up for carrying out the method.

A preferred embodiment of the method in accordance with the invention is characterized in that the temperature difference between the first and the second temperature ranges between 25° and 85°, and is preferably approximately 50°.

An important criterion for a good selection test is that the method yields a reliable distinction between usable and non-usable glass parts. A "non-usable" part is to be taken to mean, in this application, that there is a relatively great risk that such a part, which forms part of the air-tight envelope of a display device, will be subject to implosion during evacuation and warm-up of the envelope; conversely, a "usable" part runs a relatively small risk of implosion during evacuation and warm-up. In addition, care must be taken that, in the long run, the method does not adversely affect the glass part, for example, because the treatment causes the quality of the part to deteriorate, which may not give rise to problems until later in the life of the display device. If the temperature difference between the first and the second temperature is too large, i.e. $T_2-T_1>85°$, the risk of crack growth as a result of the thermoshock treatment is increased, which leads to a relatively high failure percentage of the glass parts, which is undesirable. In general, the failure probability increases substantially with temperature. If the temperature difference between the first and the second temperature is too small, i.e. $T_2-T_1<25°$, crack growth occurs only exceptionally, so that the selection treatment has (almost) no power of discernment. Experiments have shown that, between said differences in temperature ($25°\leqq T_2-T_1\leqq 85°$), a noticeably different response to the thermoshock treatment occurs. Experiments have further shown that the method in accordance with the invention has a great power of discernment as to the further processability of the part at a temperature difference between the first and the second temperature of approximately 50° ($T_2-T_1\approx 50°$).

A suitable value for the first temperature ranges between 50 and 100° C., and is preferably approximately 65° C. In the case of a temperature difference of, preferably, approximately 50° ($T_2-T_1\approx 50°$), this results in a value for the second temperature of approximately 15° C. ($T_2\approx 15°$ C.).

A preferred embodiment of the method in accordance with the invention is characterized in that the glass part is a display window or a cone portion of a display device. Particularly surface damage in combination with stresses in the raised edge of the display window or surface damage in the cone portion cause undesirable product failure. A display window or cone portion which cracks as a result of the thermoshock test can be added without further treatment (as so-called cullet) to the glass mixture in the melting furnace from which display windows or cone portions are made. If the display window is already provided with a phosphor pattern and/or, during removing the frit connection between the display window and the cone portion, residues of materials (phosphor, cone glass or fritted glass) remain in or on the display window, the composition of the glass mixture in the melting furnace is adversely affected.

A preferred embodiment of the method in accordance with the invention is characterized in that the fluid comprises a liquid having a coefficient of thermal conduction ($\lambda$) above 0.4 $Wm^{-1}K^{-1}$. A liquid having a relatively high coefficient of thermal conduction allows an effective heat transfer of the second temperature to the glass part, if said part originates from an environment having a higher first temperature. The higher the coefficient of thermal conduction, the more effective the thermoshock treatment is. Water is a particularly suitable liquid.

Preferably, the fluid comprises a liquid such that the product of the specific mass ($\rho$) and the specific heat ($c_p$) is greater than $\rho \times c_p = 2\times 10^6$ $Jm^{-3}K^{-1}$. Water is a particularly suitable liquid.

By using the method in accordance with the invention, the risk of fracture or implosion of the display device during the manufacture of the display device is reduced, which has a favorable effect on the reduction of the failure percentage and hence on the cost price.

These and other aspects of the invention will be apparent from and elucidated with reference to the embodiments described hereinafter.

BRIEF DESCRIPTION OF THE DRAWING

In the drawings.

The figures are purely schematic and not drawn to scale. Particularly for clarity, some dimensions are exaggerated strongly. In the Figures, like reference numerals refer to like parts, whenever possible.

DESCRIPTION OF THE PREFERRED EMBODIMENTS

Figure 1A:
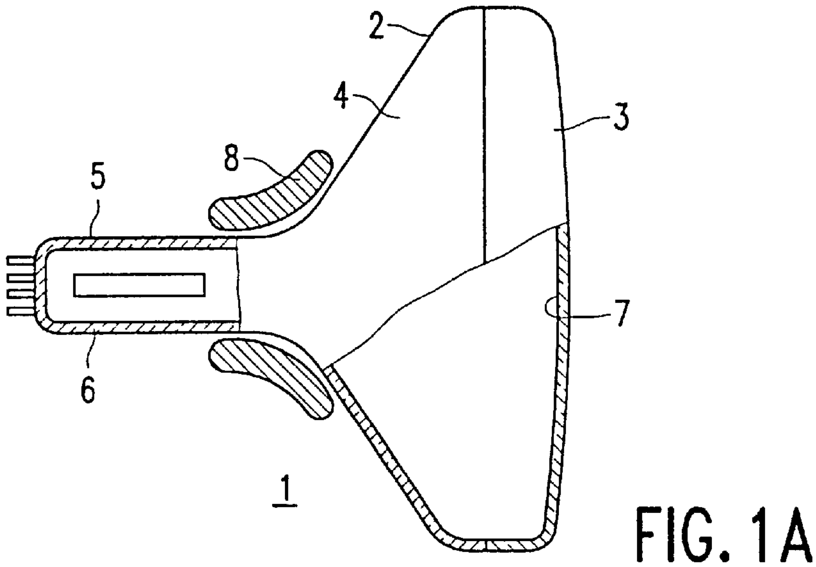
FIG. 1A is a cut-away view of a display device comprising a cathode ray tube.

FIG. 1A schematically shows a cut-away view of a display device comprising a cathode ray tube (CRT) 1 having a glass envelope 2 including a display window 3, a cone portion 4 an a neck 5. The neck accommodates an electron gun 6 for generating one or more electron beams. This (these) electron beam(s) is (are) focused on a phosphor a layer 7 on the inner surface of the display window 3. The electron beam(s) is (are) deflected across the display window 3 in two mutually perpendicular directions by means of a deflection coil system 8.

Figure 1B:
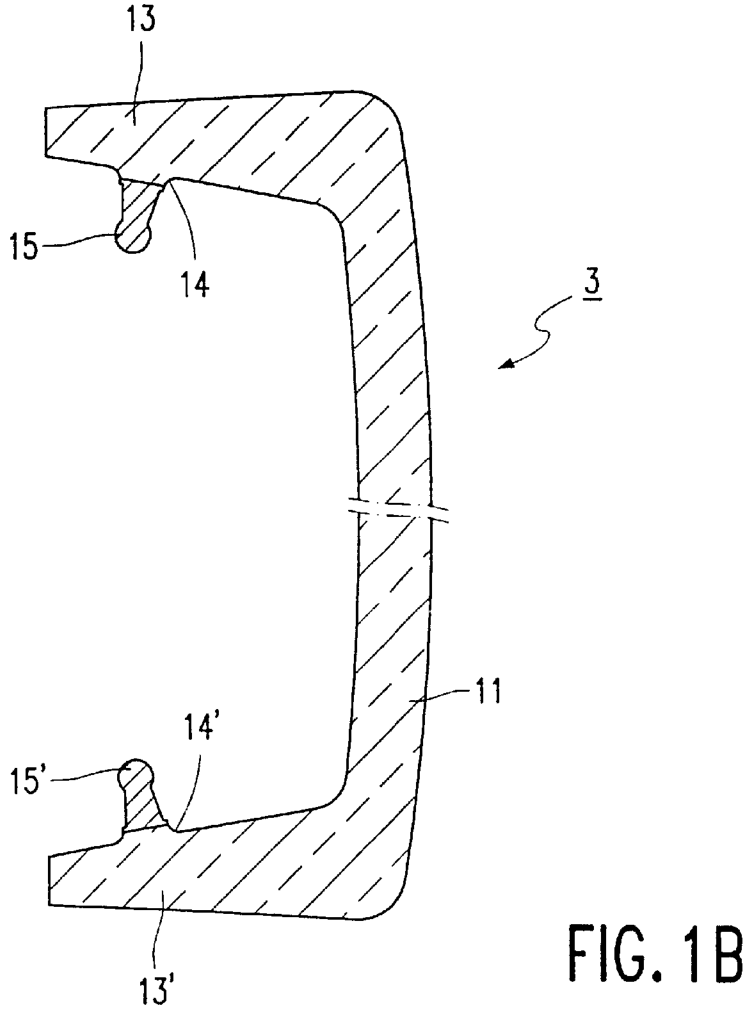
FIG. 1B is a cross-sectional view of a display window of the display device shown in FIG. 1A, and FIGS. 2A and 2B schematically show an example of the method in accordance with the invention.

FIG. 1B is a cross-sectional view of a display window 3 of the display device 1 shown in FIG. 1A. The display window comprises a curved or substantially flat part 11, a raised edge 13, 13' by means of which the display window 3 is connected, during assembly, to the cone portion 4 of the air-tight envelope 2 of the display device (see FIG. 1A). This raised edge 13, 13' generally comprises connecting points 15, 15' for a so-called shadow mask or selection electrode. For this reason, protrusions 14, 14' are provided at suitable locations on the inside of the raised edge 13, 13'.

Figures 2A, 2B:
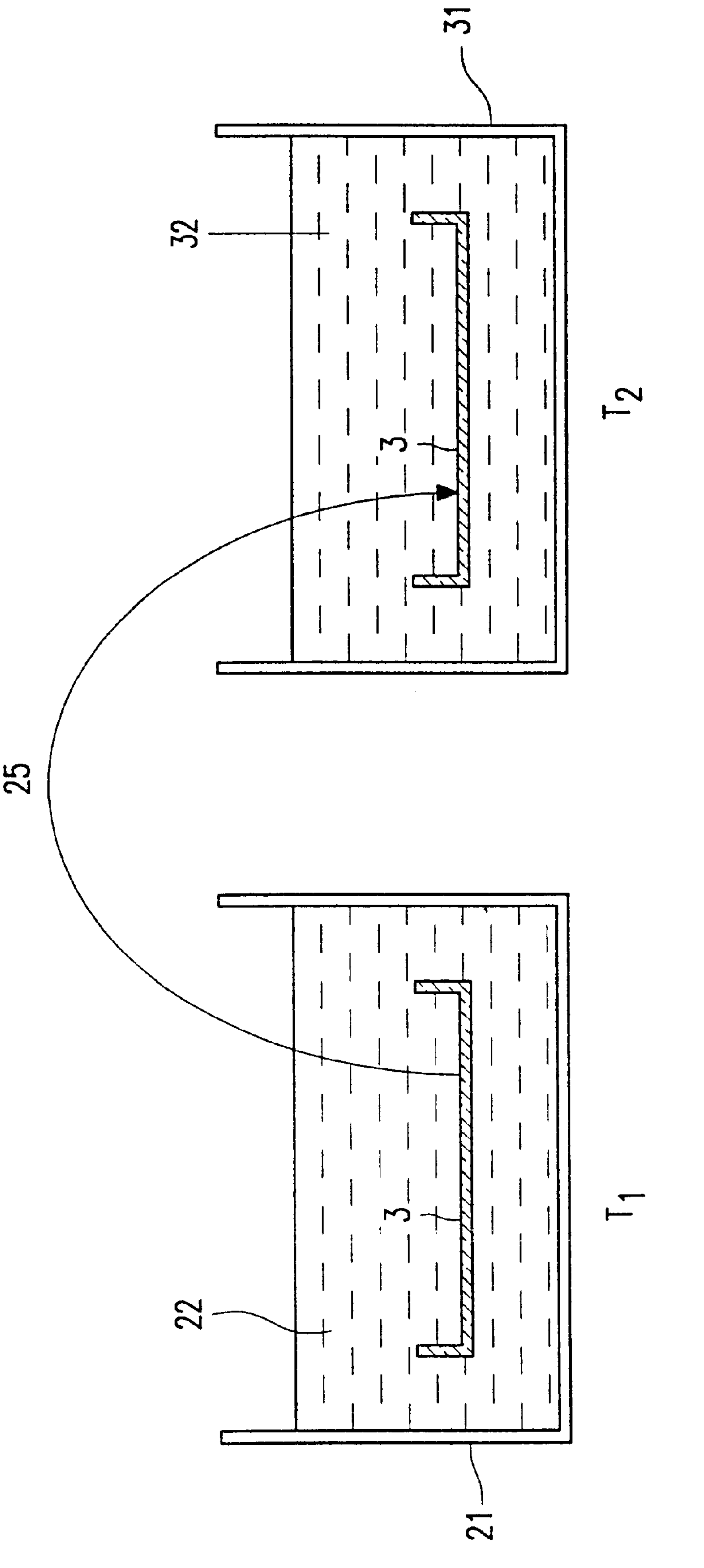

FIGS. 2A and 2B schematically show an example of the method in accordance with the invention. In FIG. 2A, a glass part is warmed up to a first temperature $T_1$. In the example of FIG. 2A, a display window 3, which forms part of a display device, is immersed in a warming-up vessel 21 containing a fluid 22, for example water, at a temperature $T_1$. Water has the advantage that it has a high coefficient of thermal conduction ($\lambda\approx 0.6$ $Wm^{-1}K^{-1}$), which leads to a rapid warm up of the glass part. The warm-up in a water bath 21 having a suitable temperature leads to a uniform and homogeneous warm-up of the part. The shape of the part determines the time period $t_1$ which the part needs to reach a uniform temperature $T_1$. To render the production of said parts as economical as possible, it is desirable that the residence time in the warming-up vessel 21 is as short as possible. In the case of a display window 3 having a relatively large surface area relative to the generally small thickness of the glass, the desired warming-up time $t_1$ is at least 2 minutes and preferably 5 minutes. Alternative ways of warming up the glass part include: irradiating the part using heat-emitting (infrared) radiators, or introducing the glass part into a suitable furnace. The temperature $T_1$ preferably ranges between 50° C.$\leqq T_1 \leqq$100° C., and is, in particular $T_1\geqq$65° C., said temperatures being suitable if water is used as the warming-up medium.

In FIG. 2B, a glass part is cooled down to the second temperature $T_2$. In the example of FIG. 2B, a display window 3, which forms part of a display device, is immersed in a cooling vessel 31 which contains a fluid 32, for example water. The temperature difference between the first and the second temperature preferably ranges from $25°\leqq T_1-T_2\leqq 85°$, and, in particular, $T_1-T_2\approx 50°$, which yields a suitable temperature for the cooling vessel if water is used as the cooling medium. Water has the advantage that it has a high coefficient of thermal conduction ($\lambda\approx 0.6$ $Wm^{-1}K^{-1}$). Moreover, the product of the specific mass ($\rho$) and the specific heat ($c_p$) of water: $\rho\times c_p$, gives a high value of $4.2\times10^6$ $Jm^{-3}K^{-1}$, which results in a desirable, rapid cooling of the glass part. To produce said parts as economically as possible, it is desirable that the residence time in the cooling vessel 31 is as short as possible. For a display window 3 having a relatively large surface area relative to a generally small thickness of the glass, a cooling time $t_2$ of at least 5 seconds, preferably 10 seconds, is sufficient.

At a given moment, after the glass part has been warmed up at least substantially uniformly to a temperature $T_1$, it is transferred from the warming up vessel 21 to the cooling vessel 32 having a temperature $T_2$. In FIG. 2, this transfer operation is symbolically indicated by arrow 25. The transfer of the glass part to a colder environment causes the glass part to be cooled-down suddenly, which is also referred to as quenching. Such a thermoshock treatment gives rise to crack formation in the glass part, which process is initiated at a location where the surface is damaged and/or at locations where relatively large (surface) (tensile) stresses occur in the glass part. Such a treatment of glass parts, in particular of display windows which form part of the air-tight envelope of display devices, enables a good selection to be made at an early stage between usable and non-usable display windows.

Experiments have shown that the method in accordance with the invention yields a good selection of glass parts. Minor surface damage at arbitrary locations gives rise to crack growth which starts already at the location of the damaged spot at relatively low thermal stress levels. In the case of display windows, it has further been found that, in the absence of surface damage, crack growth generally starts at the location of the raised edge of the display window. Crack growth is often initiated by a relatively low compressive stress in this so-called seal edge. The thermoshock treatment does not distinguish between surface roughness and internal stress, so that the thermoshock treatment generally is indicative of a combined effect of both phenomena.

It will be obvious that within the scope of the invention, many variations are possible to those skilled in the art.

In general, the invention relates to a method of manufacturing a display device comprising an air-tight envelope and at least a glass part (3) which forms part of said air-tight envelope. The method is characterized in that the glass part is warmed up, during a first time period, at a first temperature ($T_1$), whereafter the glass part is immersed, during a second time period, in a fluid at a second temperature ($T_2$), said second temperature being lower than the first temperature ($T_2<T_1$). Preferably, $25°\leqq T_1-T_2\leqq 85°$, and, in particular, $T_{11-T2}\approx 50°$. Preferably, $50°$ C.$\leqq T_1\leqq 100°$C., and, in particular, $T_1\approx 65°$ C. Preferably, the glass part is a display window or a cone portion of a display window, and the fluid is water.

According to one aspect of the invention, a glass part of an air-tight envelope of a display device is tested for defects by warming it up to a first temperature during a first time period prior to incorporation of the glass part into the envelope. Then, while the glass part is still at the first temperature, it is immersed for a second time period in a fluid that (when the immersion commences) is at a second temperature that is lower than the first temperature.

The invention can be used to perform a thermal shock test of parts such as a faceplate for example.

The faceplate is first placed in a fluid at a high temperature, whereafter it is quickly transferred to a second fluid (both fluids could be the same, e.g. water) at a substantially lower temperature. The sudden drop in temperature induces a thermoshock effect in the part, which causes flaws such as cracks and stress to become visible. The appearance of such flaws is used to distinguish usable parts from flawed parts. The method makes it possible to remove flawd parts from the production line at an early stage, thus reducing the percentage of displays that do not pass the final inspection or have a reduced life expectancy.

What is claimed is:

1. A method for testing for defects in a glass part of an air-tight envelope of a display device characterized in that: prior to incorporation of said glass part into said envelope, said glass part is warmed up to a first temperature during at a first time period which lasts at least 2 minutes and then, commencing while said glass part is still at the first temperature, said glass part is immersed for a second time period which lasts at least 5 seconds in a fluid that when said immersion commences is at a second temperature between 25° C. and 85° C. lower than the first temperature.

2. A method as claimed in claim 1, characterized in that the first temperature ranges between 50 and 100° C.

3. The method as claimed in claim 2, wherein the first temperature is approximately 65° C.

4. The method as claimed in claim 1 wherein the first time period lasts about 5 minutes and the second time period lasts about 10 seconds.

5. A method as claimed in claim 1, characterized in that the glass part is a display window or a cone portion of a display device.

6. A method as claimed in claim 1, characterized in that the fluid comprises a liquid having a coefficient of thermal conduction ($\lambda$) above 0.4 $Wm^{-1}K^{-1}$.

7. A method as claimed in claim 1, characterized in that the fluid comprises a liquid such that the product of the specific mass ($\rho$) and the specific heat ($c_p$) is greater than $2\times10^6$ $Jm^{-3}K^{-1}$.

8. A method as claimed in claim 1, characterized in that, during the first time period, the glass part is situated in water at the first temperature.

* * * * *